United States Patent [19]
Hardikar et al.

[11] Patent Number: 6,097,887
[45] Date of Patent: Aug. 1, 2000

[54] SOFTWARE SYSTEM AND METHOD FOR GRAPHICALLY BUILDING CUSTOMIZED RECIPE FLOWCHARTS

[75] Inventors: Manoj Hardikar, Saratoga; Steve Zhou, Cupertino; Richard Shiflett; Ashok Kulkarni, both of San Jose, all of Calif.

[73] Assignee: KLA-Tencor Corporation, San Jose, Calif.

[21] Appl. No.: 08/958,780

[22] Filed: Oct. 27, 1997

[51] Int. Cl.$^7$ ....................................................... G06F 9/45
[52] U.S. Cl. ........................... 395/701; 395/701; 395/702; 395/703
[58] Field of Search ............................. 364/188; 345/357, 345/552; 379/216; 395/183.14, 701, 712, 702; 707/503

[56] References Cited

U.S. PATENT DOCUMENTS

| | | | |
|---|---|---|---|
| 4,805,089 | 2/1989 | Lane et al. | 364/188 |
| 5,226,118 | 7/1993 | Baker et al. | 395/161 |
| 5,251,126 | 10/1993 | Kahn et al. | 364/413.11 |
| 5,375,201 | 12/1994 | Davoust | 395/161 |
| 5,381,470 | 1/1995 | Cambray et al. | 379/216 |
| 5,428,554 | 6/1995 | Laskoski | 364/550 |
| 5,481,741 | 1/1996 | McKaskle et al. | 395/800 |
| 5,483,468 | 1/1996 | Chen et al. | 364/551.01 |
| 5,537,630 | 7/1996 | Berry et al. | 395/155 |
| 5,550,964 | 8/1996 | Davoust | 395/140 |
| 5,559,718 | 9/1996 | Baisuck et al. | 364/491 |
| 5,586,059 | 12/1996 | Oshelski et al. | 364/552 |
| 5,623,592 | 4/1997 | Carlson et al. | 395/348 |
| 5,646,871 | 7/1997 | Cadot | 364/579 |
| 5,649,169 | 7/1997 | Berezin et al. | 395/500 |
| 5,675,752 | 10/1997 | Scott et al. | 395/333 |
| 5,740,440 | 4/1998 | West | 395/704 |
| 5,761,064 | 6/1998 | La et al. | 364/468.17 |
| 5,786,816 | 7/1998 | Macrae et al. | 345/339 |
| 5,802,523 | 9/1998 | Jasuja et al. | 707/103 |
| 5,826,237 | 10/1998 | Macrae et al. | 705/2 |
| 5,850,221 | 12/1998 | Macrae et al. | 345/348 |
| 5,893,105 | 4/1999 | Maclennan | 707/102 |

OTHER PUBLICATIONS

Beck et al, "A database design for uniform representation of hypermedia and mathematical models", Proc. of 94 winter simulation, pp 619–624, 1994.

Ornburn et al, "Building, modifying and using component generators, " IEEE, pp 391–402, 1993.

Weeks, "The sweet smell of C++", Windows Tech Journal, pp 69–72, Sep. 1994.

Sellers, OO Diagram Connectivity, JOOP, pp. 60–68, Nov. 1998.

Jim Boyce et al., Using Microsoft Office 97 Professional, Best Sellers Edition, Jan. 1997, pp. 1–1268, see pp. 336–343, 365–421, 692–695, 697–701, 1023–1029, 1075–1097.

Primary Examiner—Tariq R. Hafiz
Assistant Examiner—Anil Khatri
Attorney, Agent, or Firm—Carr & Ferrell LLP

[57] ABSTRACT

A software system and method is disclosed for creating analytical graphics such as bar charts and the like with greater flexibility in an object-oriented Window® environment. The software is particularly applicable to analyzing production data in semiconductor quality control. The user customizes the analytical tools by selecting production parameters from a dialog box, and creates flowcharts on the computer display representing the sequence of production variables and production functions previously selected. The software is set up with a macro recording function to remember the production keystrokes previously selected. The analytical sequence represented by the flowchart is automatically executed whenever it is selected by the user, or this sequence can be preprogrammed to run at specified intervals in the future. Thus, the user can automatically generate reports of production data on a regular basis to a particular output device, such as a printer, server, or computer screen, or alert an operator by e-mail or paging systems.

2 Claims, 18 Drawing Sheets

SOFTWARE SYSTEM AND METHOD FOR GRAPHICALLY BUILDING CUSTOMIZED RECIPE FLOWCHARTS

CROSS-REFERENCE TO RELATED APPLICATIONS

This application is related to co-pending U.S. patent application Ser. No. 08/958,288, filed Oct. 27, 1997, and entitled, "Software System and Method for Extending Classifications and Attributes in Production Analysis," to common inventors and assignees which is hereby incorporated by reference.

BACKGROUND OF THE INVENTION

1. Field of Invention

This invention relates to computer software, and particularly to a software package for building customized charts and flow diagrams with executable conditions. The applications include quality control monitoring for production lines such as semiconductor production.

2. Discussion of the Background Art

Software packages are increasingly being written for Windows® formats so that a user may interact with the program through symbols on the computer screen via mouse clicks or arrow keys. Such programs are typically written in Visual C++ or Visual Basic programming language, and permit the programmer to call on generalized programming objects to display selectable data input fields. These programs are more user-friendly and afford greater flexibility because the user can choose to select from any one of a large number of program functions based upon displayed visual cues.

One of the primary tools utilized by a programmer is the flowchart. Most programs begin with the programmer manually drawing a flowchart of what he wants his program to do. Flowcharts are formed by a series of linked graphical symbols with corresponding functions. For example, a diamond shape in a flowchart represents a conditional, and branching links from the diamond express the conditions presented by the data. Drawing programs such as Top Down® currently exist to create flowcharts, circuit diagrams and other drawings on a computer.

It is also known to employ icons on a computer screen to produce programming shortcuts and to access a given program or document. These icons perform a single programming function, e.g. transferring the display into a given document and/or a given program. While multiple subfunctions are performed upon selection of any icon, only one icon is selected at a time.

Object oriented programming permits a programmer to call upon a particular functional subroutine in Windows® which is modular in design and operable across a large number of different hardware systems. The objects can be used to design programming functions, e.g. button bars, slide bars, toolbars, etc.

Another function that is commonly used in word processing programs such as Word®, and WordPerfect® is the macro. A macro is a way of storing instructions and strings in a computer so that automated, customized commands can be created by the user. The macro essentially records the literal keystrokes of the user. These keystrokes may be text strings, function key selections, selections from menu items, print commands, or even exiting procedures. Macros are quick, handy, and powerful tools that permit user-friendly programming without specific knowledge of a programming language. Even if one has great expertise in programming languages, it may be simpler and more effective to create commands with macros.

Quality control has historically relied upon automated computer systems. The automated production line replaces the manual laborer and automated quality control eliminates the inspectors. Today, one important consumer of quality control is the semiconductor industry. Microscopic defects in a semiconductor wafer have major implications on the cost and yield of a semiconductor production process. Because semiconductor technology is so sensitive to defects, isolating their precise source in the production process facilitates great advancement in the industry.

Quality control software packages are currently available for the semiconductor industry, but the programs are generally written on a project-specific basis. These programs are written to include a large number of analytical utilities around a core system but these utilities are essentially fixed in number and cannot be modified. When a customer wishes to change the way data is analyzed, he must either call upon a new utility or create a new program. Thus, these packages are expensive and lack flexibility.

One method of measuring the number and location of defects in a semiconductor chip involves filtering or erasing the non-defect data from the production data to leave only the defect data. A map of actual production data either may be compared to a map of another set of actual production data, or to a map of an ideal set of production data stored in the computer memory. The defect data is then analyzed according to number, density, location, type and step in the production process, with the goal of correcting the production process itself. The defect data may give clues about how to increase the yield and decrease the cost of the product.

A variety of prior art data analysis systems and methods have been disclosed for industrial process control of semiconductor manufacturing. Among these are U.S. Pat. No. 5,226,118 to Baker et al. This patent discloses a system for making charts. The charts are displayed as a gallery of cells where each cell is a unit of a two dimensional array. Each cell in the chart may be defined as a mathematical function of one or more other cells in a manner similar to a spreadsheet program such as Microsoft Excel.® Other related patents are U.S. Pat. Nos. 4,967,381; 4,951,190; 4,873,623; 4,843,538; 4,805,089; and 4,679,137. These patents disclose software analytical tools with complex three level data structures. Process analysis can only be customized by selecting from a set of predefined categories supplied by the programmer at the time the software is installed.

SUMMARY OF THE INVENTION

The present invention concerns a software package for graphically creating charts and diagrams in a Windows environment. The charts may be used to analyze data from production runs based upon production variables and production functions so that a customer may more easily understand the origins of production defects. Examples of production variables are lot number, layer number, or a range of calendar dates. The quantity or other statistical measure of production defects for each of the production variables is displayed in the form of bar chart pages. These statistical measures are called production functions. The software permits the user to move from one page to another, or to place two pages side by side for comparison. It thus becomes possible to look for patterns establishing where the production defects arise.

The production variables, production functions, and type selection of the graphical display chart are recorded in a "macro"-like system where the literal keystrokes and selections are remembered by the software for each of a plurality of graphical display pages. Thus, it is not necessary for the customer to perform any express reprogramming to modify the data analysis scheme. The keystrokes of the user are recorded by the "macro" for each page of data, and the choice of variables and functions for each these pages is stored by the computer as they are created. In this manner, it becomes possible to customize a particular data analysis scheme in a modular way without having to entirely rewrite a data analysis program for every application.

The invention also includes in the software package a system and method of creating conditional relationships in the form of a flowchart for analyzing the production data, and displaying the flowcharts in graphical form. The flowchart nodes are stored in the system as the "macro" is recorded. Each page of data is displayed as one node of the flowchart, thereby representing the choice of variables and functions, as well as the type of chart display selection. The customer can also create conditional relationships, such as would be represented by a diamond shape in a standard flowchart, between the data analysis schemes for each page of data by selecting from a dialog box on the flowchart page. Thus, a user can specify that a follow-up test is performed only in the event that the results from a previous test exceed some predetermined value. The entire data analysis scheme represented by the flowchart is executed by pressing a button on the toolbar of that window page.

The invention further includes a system and method for selecting and automatically executing the flowchart at any time specified by the customer. The flowchart conditionals are flexibly changed by the customer, so that it is easier to customize a given data analysis scheme for a variety of applications. The user may provide that a particular flowchart conditional data analysis scheme is automatically executed at a future time certain on a regular basis and published in any of a variety of specified formats. Customized production reports are generated at a printer or web server to permit multiple users to have access to the analysis of production data on a weekly or other basis. The execution of the flowchart analysis may also include a conditional notification node so that an appropriate operator is alerted when the results of the analysis exceed some predetermined limit. This notification may be through an e-mail message at the operator's personal computer or may be connected to a paging system.

DETAILED DESCRIPTION OF THE PREFERRED EMBODIMENTS

1. Chart Generation

Figure 1A:
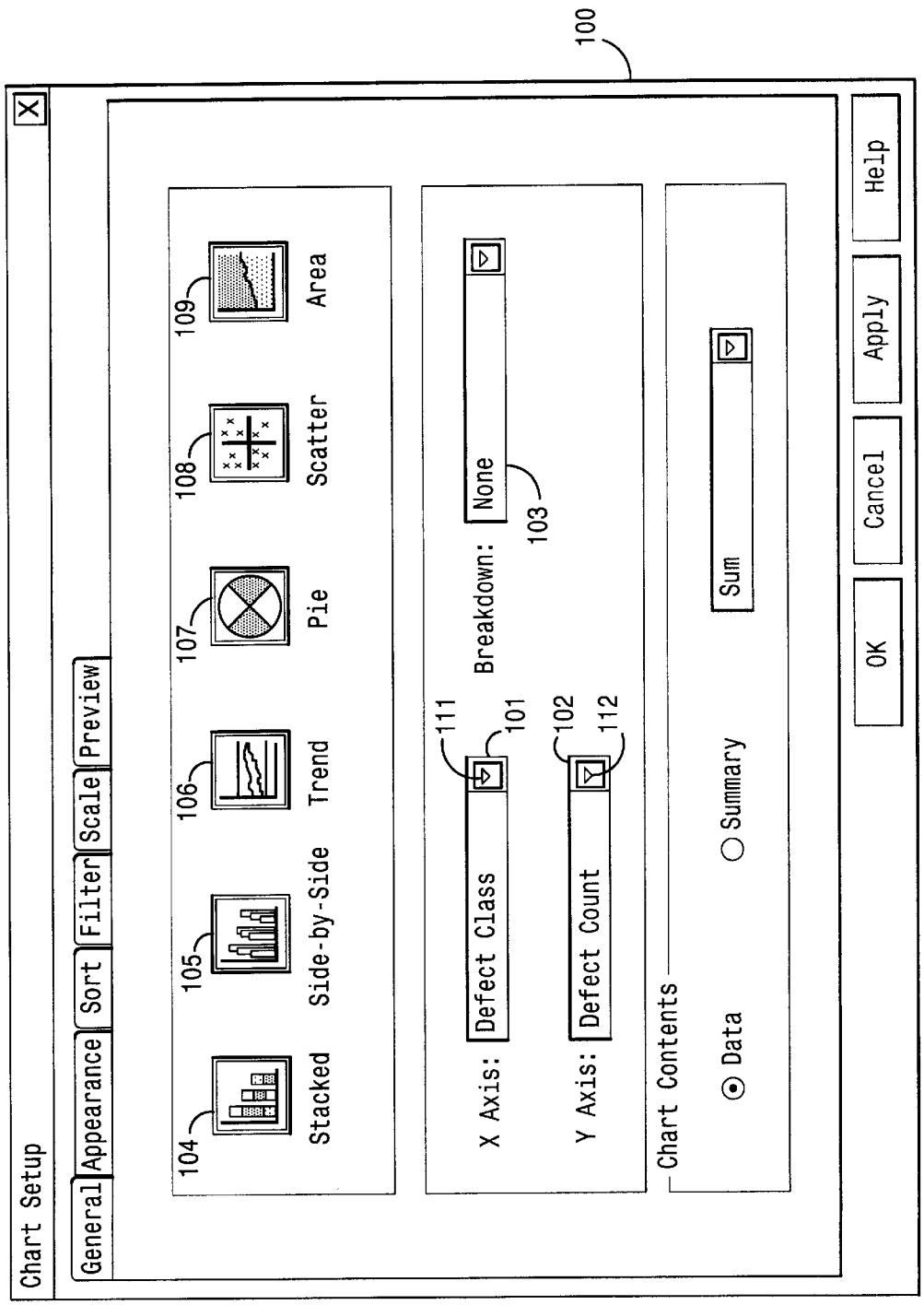
FIG. 1(a) illustrates a computer screen for specifying data analysis parameters.

FIG. 1(a) illustrates a computer screen 100 having one or more dialog boxes 101, 102, 103 for specifying data analysis parameters. Drop down list boxes 101, 102 indicate which parameters are to be placed on X and Y Axes of a bar chart. The parameters are selected with a computer mouse from a drop-down menu or similar type of dialog box 101, 102. The user clicks on any of the parameters in the menu of the dialog box 101 or 102 to select the data analysis parameters on the X and Y Axes. FIG. 1(a) shows that the X Axis parameter is the defect class and the Y Axis parameter is the defect count. There are also a series of buttons 104 to 109 for the customer to select the type of chart for data display. The chart could be a bar chart 104 or 105; a pie chart 107; a trend chart 106, 109; etc.

Preferably, the dialog box 101, 102 is a drop down list box with a vertical scroll bar. The user causes the list box 101, 102 to drop down by clicking on the arrow box 111, 112 beside of the list box 101, 102. The user clicks on one of a collection of text strings representing production variables and production functions within a columnar list within the list box rectangle. When the desired text string is found within the list box 101, 102, the user clicks on this text string which causes this text string to appear in the selection line of the list box 101, 102.

One feature of the present invention is the recording of the selected production variables and production functions in a macro feature. The computer thus remembers or learns the selection of variables and functions selected by the user, and has the capability of replaying the particular variables and functions for a new data set. The analytical system and method therefore differs from the prior art where new production parameters must be specified each time an analysis is to be performed, or where the user is restricted to choosing from only a specified set of preprogrammed analytical schemes. The macro feature stores the particular set of commands relating to the production parameters that the user has previously selected from the dialog boxes and drop down list boxes 101, 102.

Macro features are common tools in word processing environments such as Word® and WordPerfect,® but hitherto have not been applied to production analysis. The present invention thus considerably simplifies customization of production variables over prior art approaches such as Baker et al, supra, which use a complex set of data hierarchy structures, user accounts, and process identification numbers. The present invention is more user-friendly and picture-oriented. Whenever the customer makes a selection for a casebook, the selection is automatically recorded in the casebook by the macro.

Figure 1B:
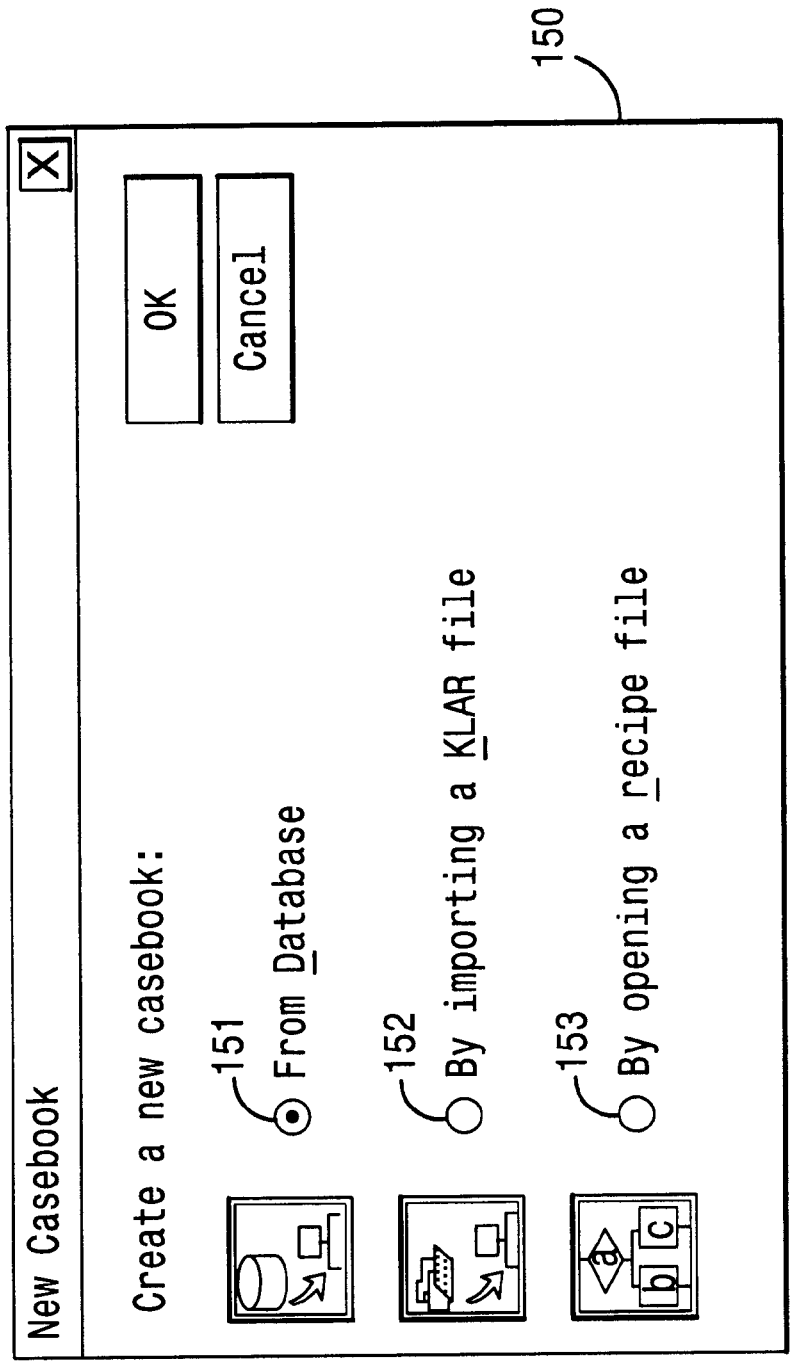
FIG. 1(b) illustrates a computer screen for setting up a casebook.

FIG. 1(b) shows a window 150 for setting up a new casebook page. A casebook is essentially a particular data analysis scheme. The casebook can be created by selecting from one of a plurality of radio buttons 151, 152, 153. A casebook is created by importing production data from a database, by importing a preexisting file, or by opening a recipe file.

Parameters applicable to monitoring production defects from the window of FIG. 1(*a*) might include number on the Y Axis and type on the X Axis. A Type Pareto Chart is then created and displayed. For example, the number of defects in a semiconductor assembly line is selected as the parameter on the Y Axis. The X Axis parameter is the defect class by number, where each number indicates a particular defect class. Other production parameters may be selected to display the number of defects by layer number. Production variables such as "layer number" are selected from the list box. The user compares the relative number of defects occurring on each layer of the product in order to isolate where production problems are occurring with the most frequency. Alternatively, the user may select a production variable such as lot number identification, or a specified range of calendar dates with the calendar feature of FIG. 2(*b*) as discussed below.

Figure 2A:
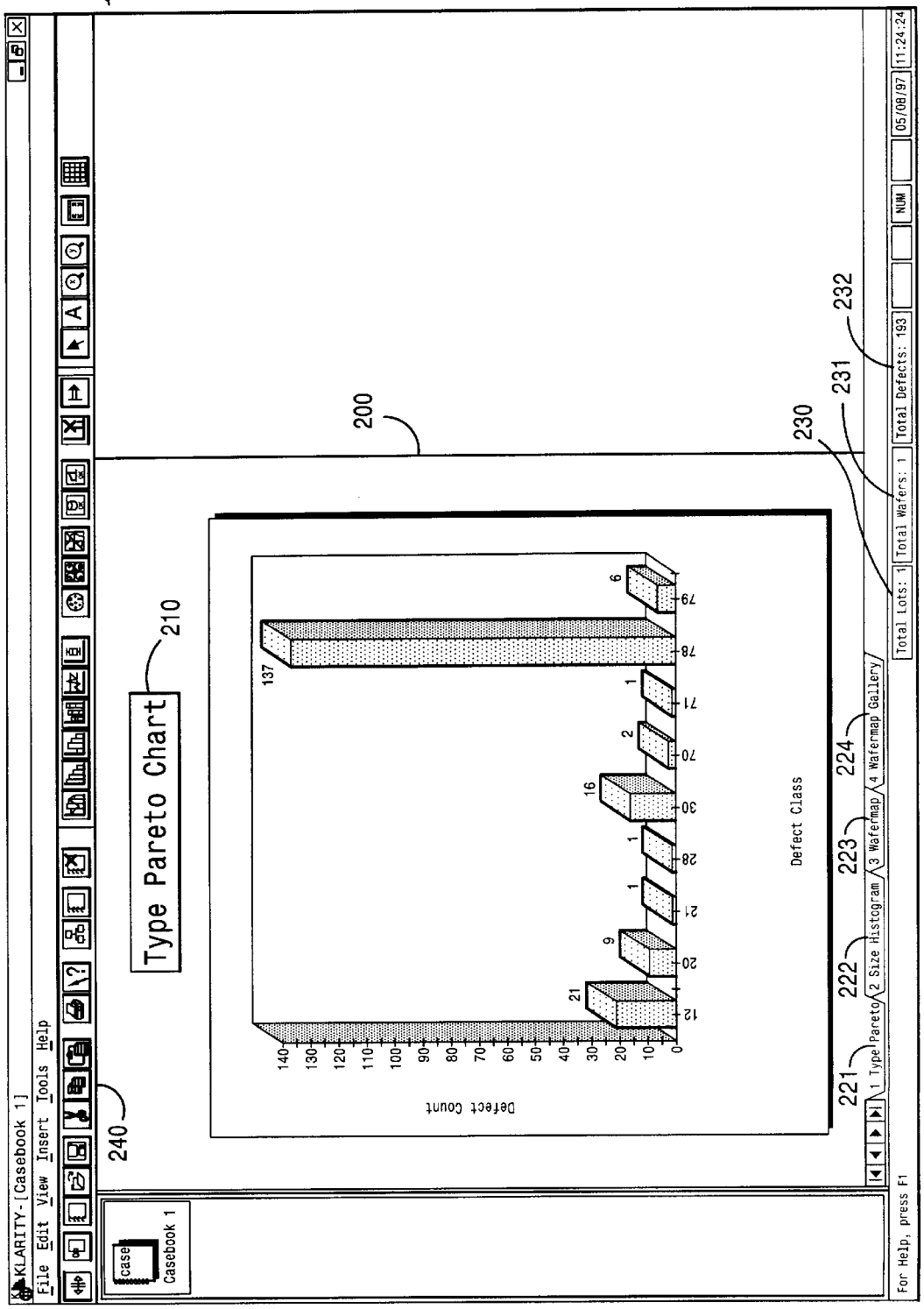
FIG. 2(a) shows a bar chart histograms produced by the software.
Figure 2B:
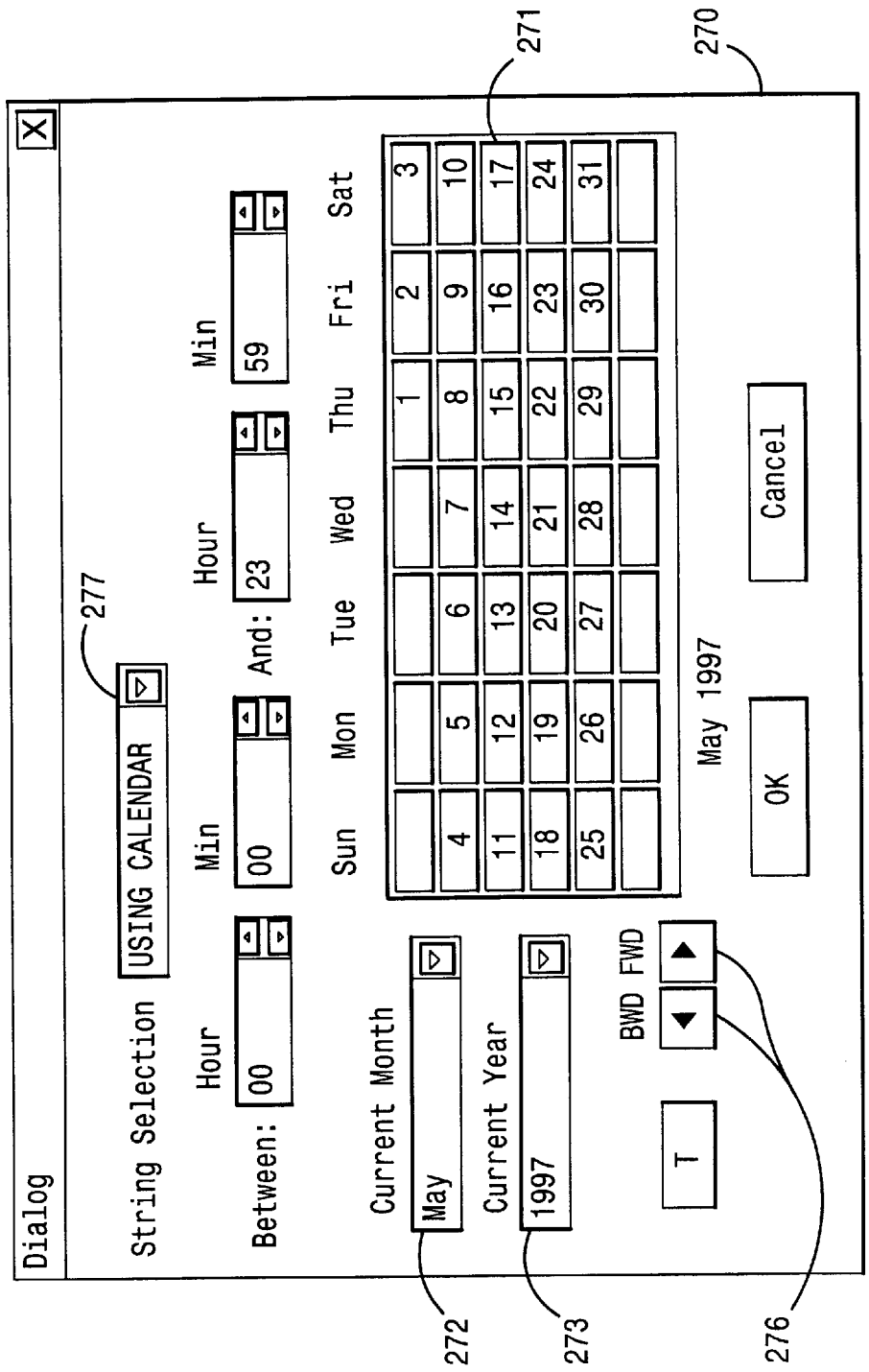
FIG. 2(b) shows a calendar produced by the software.

FIG. 2(*a*) shows a Type Pareto Chart 200 of the number of semiconductor wafer defects by defect class. An appropriate title bar 210 may be found above the window, in this case reading "Type Pareto Chart." At the bottom of the screen are tabs 221, 222, 223, 224 indicating a number of pages that are immediately accessible to the user. In FIG. 2(*a*), the pages are labeled "1 Type Pareto," "2 Size Histogram," "3 Wafermap," and "4 Wafer Gallery." By clicking on these tabs at the bottom of the page, the user can move from page to page. Smaller boxes at the bottom of the window 200 give other information such as the total number of lots 230, total number of wafers 231 and total number of defects 232. A toolbar 240 at the top of window 200 has various buttons providing further selections, such as accessing other bar charts, the wafer map of FIG. 4(*a*), or the flow chart generating window of FIG. 5(*a*); toolbar 240 further provides buttons for changing the magnification of the bar charts, or for producing the calendar of FIG. 2(*b*).

In order to produce the chart of FIG. 2(*b*), the software package for creating the bar charts 200 of FIG. 2(*a*) includes a dialog box button 241 in the toolbar kit 240. Dialog box 250 appears including a string selection drop down list box 277 shown in FIG. 2(*b*). The user then selects the method of entering dates from the string selection box 277. When the user chooses that the dates are to be selected using calendar 270, a month and year for the calendar 270 are selected from additional drop down list boxes 272, 273. Alternatively, the customer may use the string selection box 277 to enter the production variables in another manner, such as from a list box of text strings, e.g. "last ten days," "last ten lots," or input a range of dates from the keyboard in a blank field box. FIG. 2(*b*) further shows that calendar display 270 includes a plurality of push buttons 271 for each day of calendar 270. The user selects one or more push buttons 271 on the calendar 270 to indicate one or more days over which the production data is displayed in the bar chart format. It is also possible to select times within a given calendar date by the hour and minute with dialog boxes 274, 275, or page through the calendar month by month with arrow keys 276.

Figure 3:
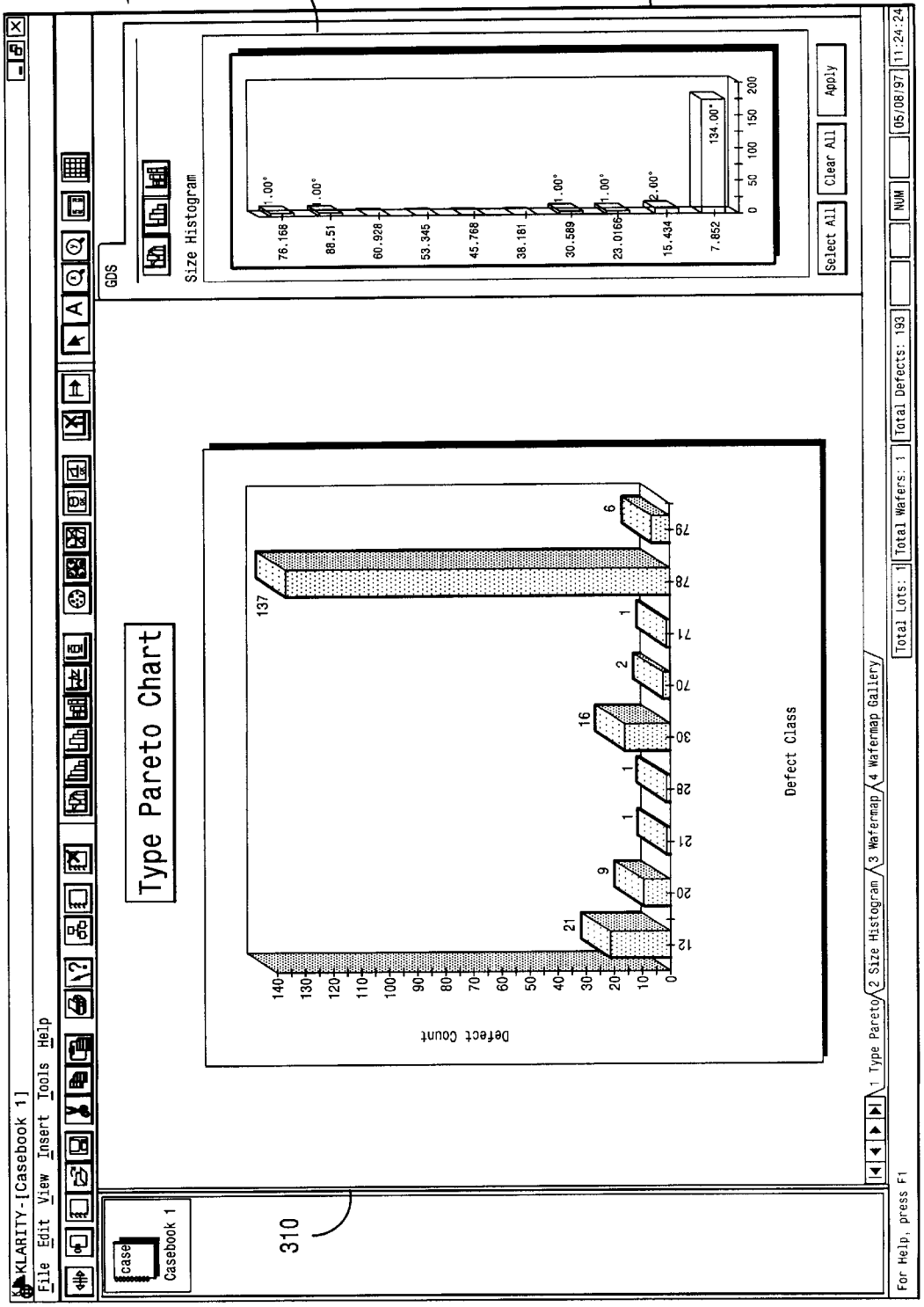
FIG. 3 illustrates a display window where two or more bar charts are placed side by side for comparison.

Referring now to FIG. 3, the software package includes a toolbar kit function that lets the user place two or more bar charts 310, 320 side by side for comparison by splitting the window 300. For example, the user has the capability of comparing a bar chart 310 of the number of defects by layer number for a first production lot relative to a similar bar chart 320 for a second production lot. The bar charts 310, 320 can be created as embedded packaged objects which can be dragged and dropped from another window, or the bar charts 310, 320 can be stored as files. The packaged object may be represented as an icon or other graphic image. The various pages are color coded for easier visibility.

2. Accessing Production Maps

Figure 4A:
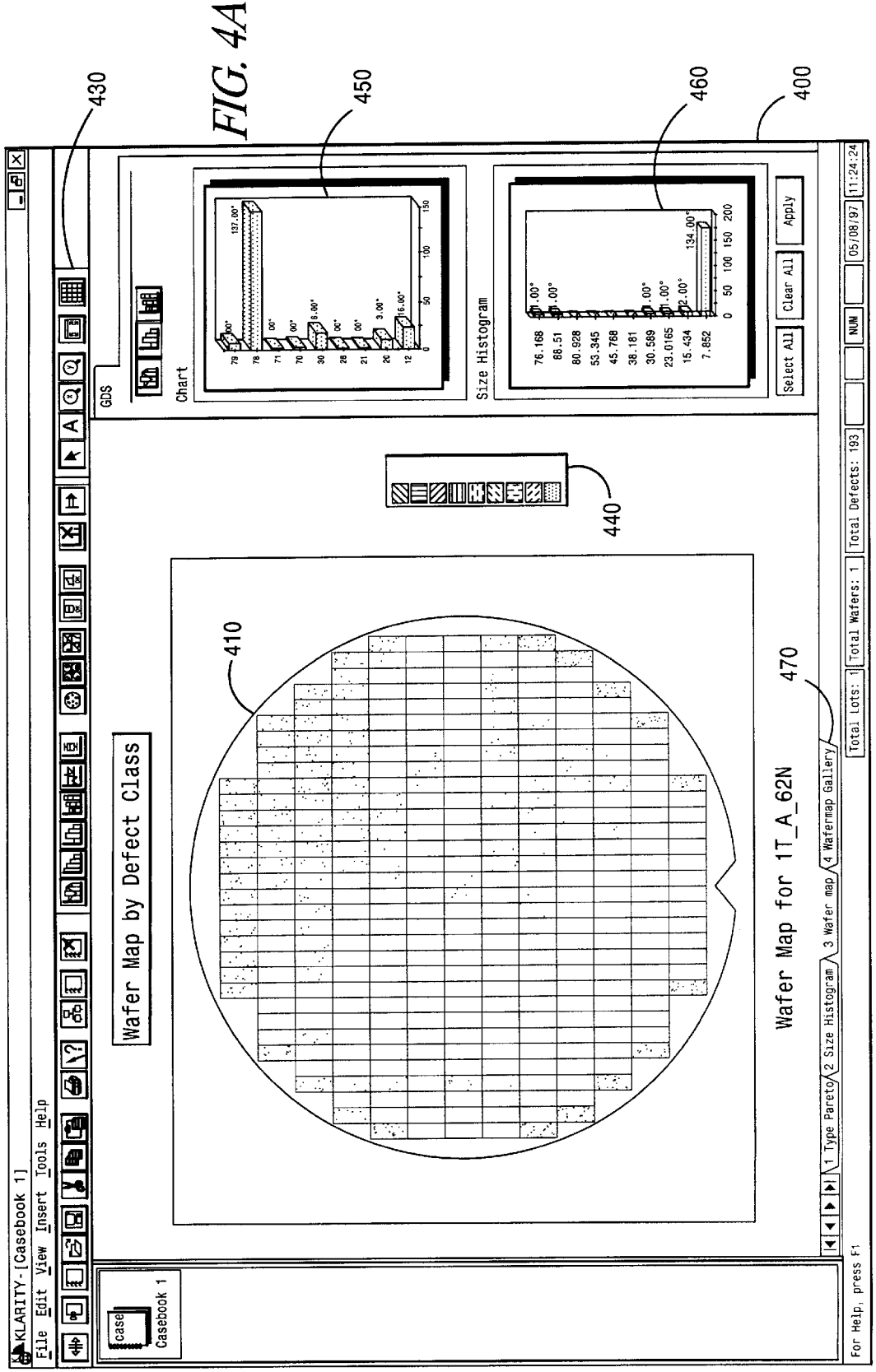
FIG. 4(a) shows a zoom feature on the software package for viewing production data.
Figure 4B:
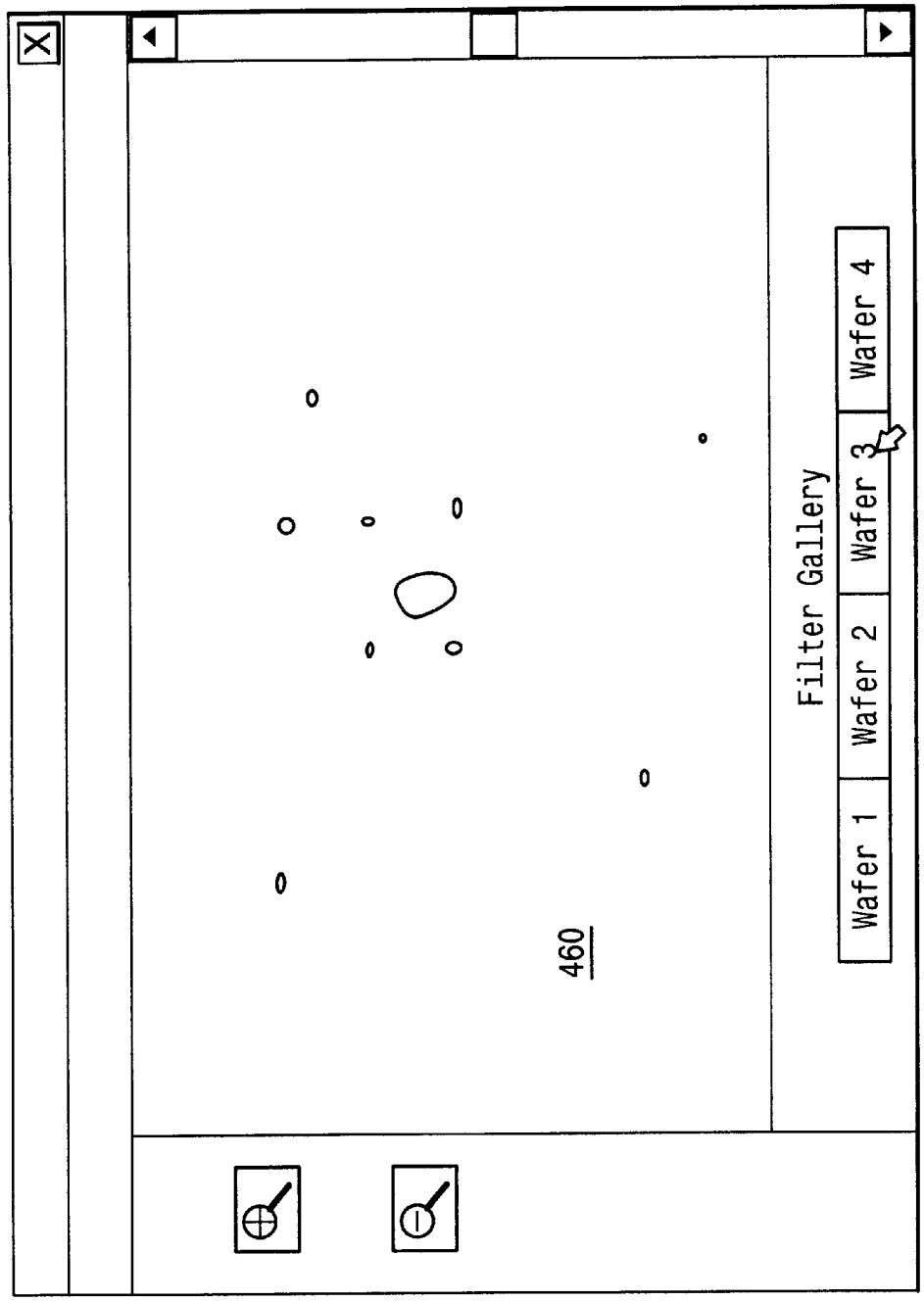
FIG. 4(b) shows a production map after filtering.

The software package of the present invention further includes a utility for accessing and displaying a production wafer map 410 in display window 400. The user zooms in or out on the production map by selecting a plus or minus zoom button bar 430 as shown in FIG. 4(*a*). Each of the particular defects is color coded to facilitate visual identification in accordance with a defect number scale 440 to the right of map 410. Side-by-side with the wafer map are shown the Type Pareto and Size Histogram charts 450, 460 imported from windows 310 and 320 of FIG. 3.

The actual production map can then be compared to another actual or ideal production map from a wafermap gallery 690 (FIG. 6(*d*)) to filter out all patterns except for defects. The user drags and drops a packaged image of the production map 410 with the computer cursor into wafermap gallery 690. The actual and ideal production maps in wafermap gallery 690 represent the way a particular product would appear if the product has no defects. A map 480 of the product without defects is accessed by selecting the tab 470 at the bottom of window 400 to page into wafermap gallery window 690.

FIG. 4(*b*) shows the production map 410, FIG. 4(*a*) after it has been filtered by information in the wafermap gallery 470. Once the actual production map 410 is subtracted from the ideal production map of the wafermap gallery 470, only a map 460 of the defects remains. By combining the selection of production parameters with filtering from the wafermap gallery 470, the user identifies the defect pattern in a particular lot number or layer number.

3. Creating Flowchart Recipes

Figure 5A:
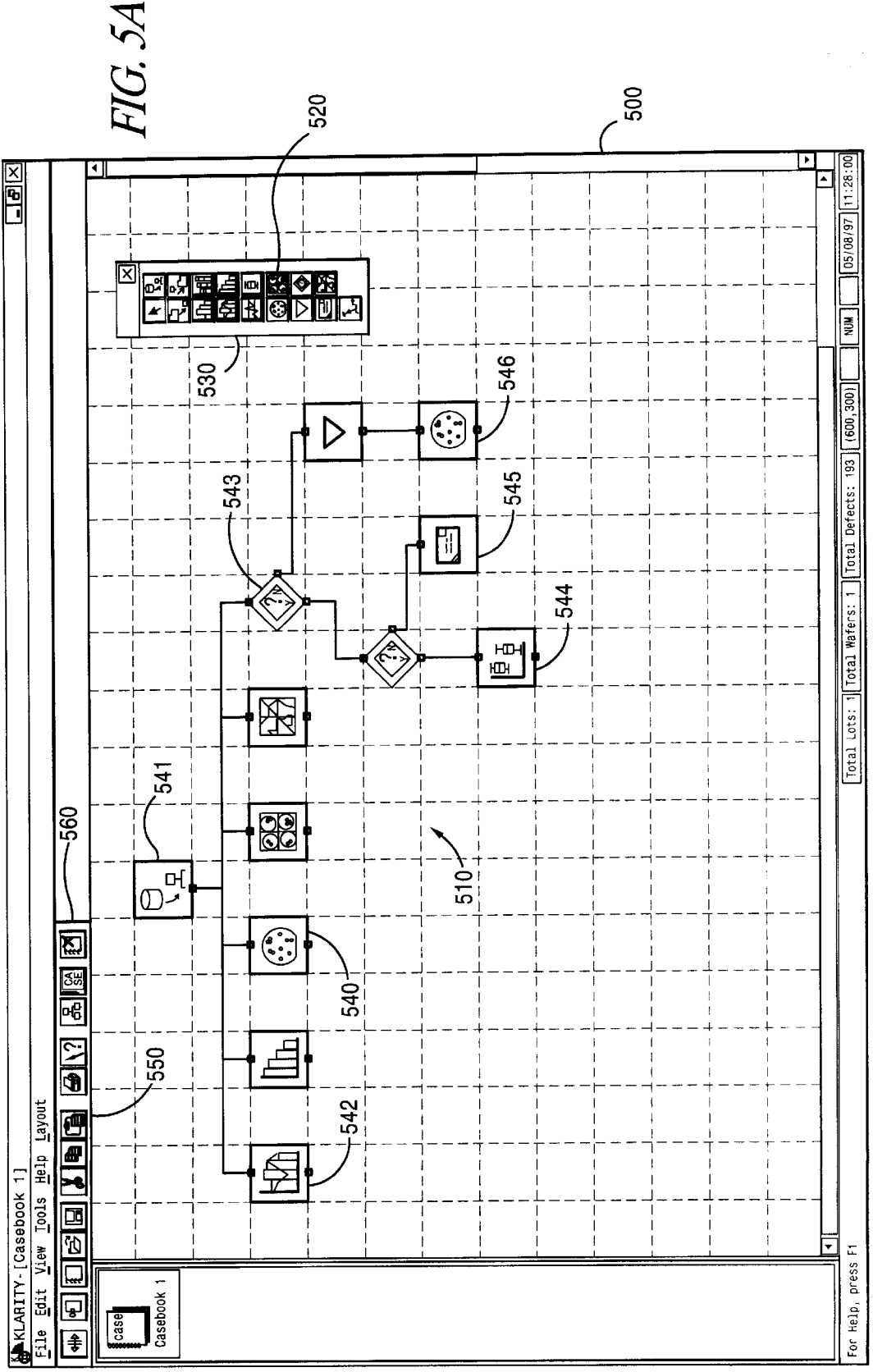
FIG. 5(a) shows the display window of a flowchart created by the software package.
Figure 5B:
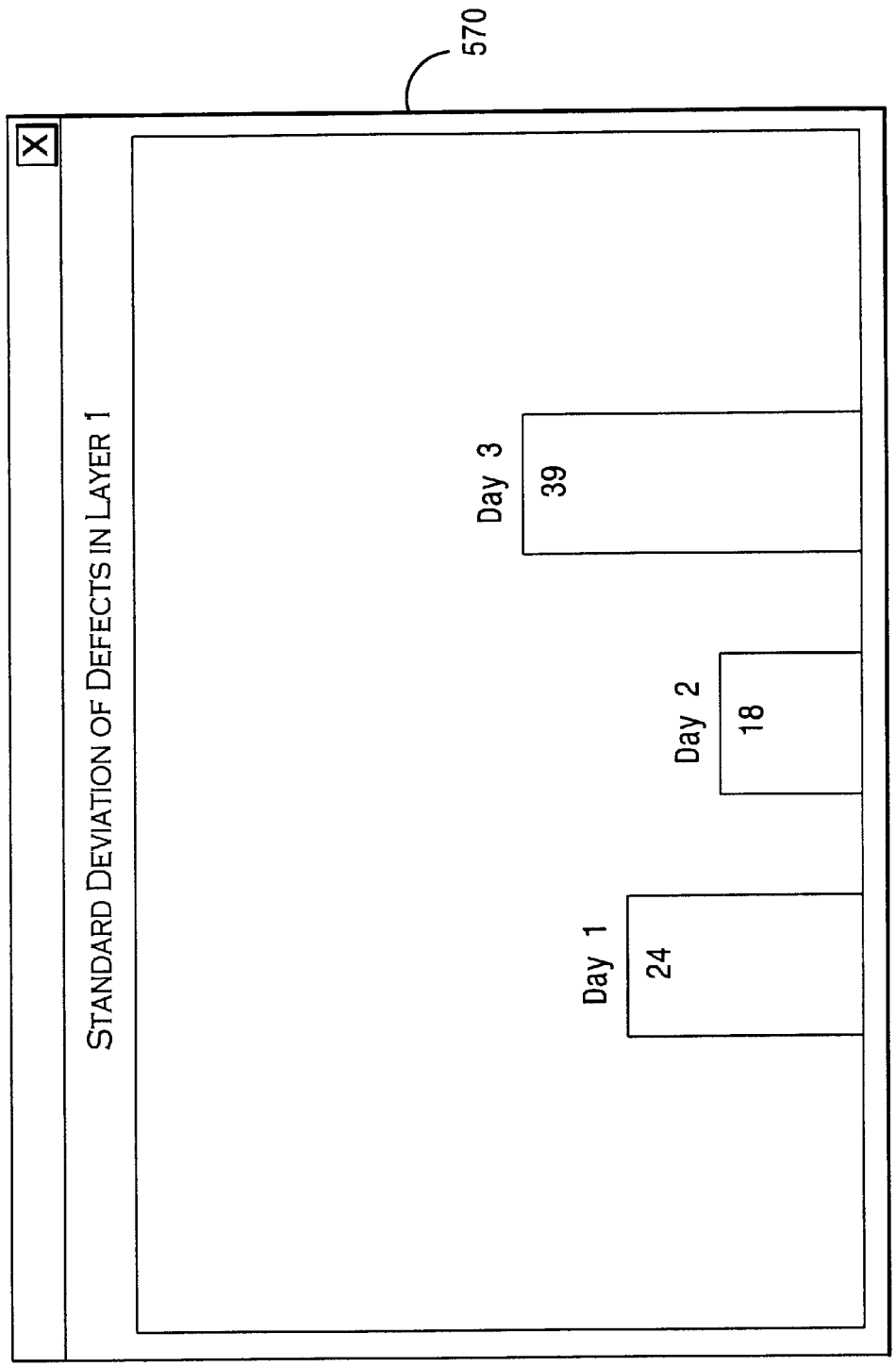
FIG. 5(b) shows a bar chart generated by selecting the flowchart of FIG. 5(a)

As shown in FIG. 5(*a*), the invention further includes a program function for building a customized flowchart 510 according to a selected recipe of conditionals. A conditional in this context is defined as an event that occurs or does not occur depending upon another value. This value may be one of the production parameters from production data or a calculated result from some previous production function. A conditional produces one or more branches in a flowchart depending upon this value. The recipe of conditionals is a series of linked conditionals that is created by the user according to a desired data analysis and response scheme.

The flowchart building program function operates in the manner of a "macro" in a computer by recording keystrokes in the casebook and playing back the keystrokes of the casebook upon command from the user. The "macro" type program function of the present invention remembers a series of production parameters specified by the user from the dialog boxes.

The casebook macro is subsequently converted into flowchart 510 by the software and displayed. Each of the selected production parameters and production functions is assigned a geometrical element in the flowchart depending upon its function, e.g. box, circle, diamond. The geometrical elements of the flowchart correspond to their standard definitions in flowchart lexicography; a circle is an input-output function, a diamond is a branching conditional, and a box is a data calculation. As shown in FIG. 5(*a*), the user can also create the flow chart by dropping and dragging a node 520 from a dialog box 530 and linking it to one of the previous nodes 540 in the flow chart 510. Whenever the user wishes to execute a particular analytical scheme on the production data, he selects the flowchart 510 from the current page by pressing a particular button 550 on the toolbar 560. The recipe represented by the flowchart may be readily modified by re-recording the conditional selections, redisplaying a new flowchart, and reexecuting the new flowchart, or the customer has the option of programming the flowchart more directly via the node dialog box 530.

The user may wish, for example, to execute on a regular basis a flowchart 510 that produces the standard deviation of defects in the second layer of the product for the last ten days. This particular flowchart 510 has been previously created and recorded by the customer. Each of the pages in the casebook has a corresponding graphical node symbol 541, 542, 543, 544, 545 and 546 which is displayed in the window 500 upon selection. After this flowchart 510 is created, it is displayed in a linked fashion in the display window 500 as shown in FIG. 5(*a*). The user then generates one or a series of bar charts such as the bar chart 570 shown in FIG. 5(*b*), or performs other functions by selecting this particular flowchart 510 shown in the display window 500 of FIG. 5(*a*).

An analytical subroutine represented by the flowchart may be automatically executed by the user on a regular basis. Generic groupings of production data such as "last ten days" or "last ten lots" are specified rather than dates certain. This analytical subroutine is then executed, say, every week or every two weeks, without operator intervention. Reports of one or more of these analytical schemes are then automatically generated at these times. The reports may be generated automatically either at the operator's computer, where they are stored in data files, or at a print station. The operator specifies the number of copies of these reports to generate, and the location that they are generated is selected via the network printer.

A plurality of these reports are automatically published on a preestablished regular basis without taking up the operator's time on every occasion. Copies are routed to selected individuals responsible for overseeing production. Alternatively, instead of printing these reports on a network printer, they can be routed on a regular basis in an electronic format through a network server. The network can be either a local area network or an Internet location on the World Wide Web. Electronic publishing has the advantages of conserving paper and reducing costs.

It is also possible to automatically utilize the results of the previous data analysis subroutine to conditionally change the scheme of the data analysis, and the subsequent publication of the reports. If a condition is detected where the results of a particular analysis exceed a preset value, then other predetermined analyses are performed to more precisely identify the source of the defect. Effectively, a feedback loop is set up to maintain tight control between the inspection results and the analytical scheme. When the results of an analysis exceed predetermined control levels, a notification may be sent to the engineer through e-mail or pager systems to take a specified remedial action. A report might also be sent back to the production line to automatically launch a process change, e.g. across the Internet to launch a Java applet. Thus, the analytical tool of the present invention is more than just a data gathering mechanism since process control can be implemented automatically via a feedback loop.

One application of the analysis routine of the present invention is to determine when a defect is an "adder," i.e. a defect that is not present on any previous layer. These adder defects are subtracted from the defects that were present on the previous layers, and then classified by the Automatic Defect Control (ADC) program.

4. Extending Classifications

Optical pattern recognition systems exist to permit a computer to classify certain types of defects. In the present invention, a neural network provides analysis of pattern recognition of the defect type. For example, a defect such as a scratch exhibits certain familial similarities to other scratches, i.e. the defect is long and thin. By abstracting the characteristic similarities of this class of defects, the computer recognizes and classifies based upon the abstracted characteristics through the Automatic Defect Classification program. The present invention may recognize at least 256 types of defects. However, the various classes of defects that prior art pattern recognition systems can identify is typically fixed by the particular software program. It thus becomes desirable to be able to add new defect classifications when they become identifiable.

Moreover, the basic mode of analysis may vary from one fabrication laboratory to another fabrication laboratory, or even from one processing engineer to another processing engineer. Each of these users may have a different definition of what is a killer defect, i.e. a defect that causes the chip to fail. The definition of a killer defect for one fabrication laboratory might be quite complex, and three or four databases might have to be accessed to perform the analysis.

Defects often are present in groups or clusters since the causative factor leading to the defect is repeated in a general area on the wafer. These defect groups are referred to as cluster classifications. The optical pattern recognition system is capable of detecting these cluster classifications in a production map.

Referring now to FIG. 6(*a*), the present invention includes a software procedure for integrating new cluster classifications into the analysis algorithm. Preferably, this algorithm extension is applied to cluster classifications of semiconductor defects. The program contains a table namespace 610 of cluster classifications 620 of defects. These cluster classes 620 may include defects 621 such as a scratch, particle, blowout, pinhole, etc., or the defects may be classified by size.

Figure 6A:
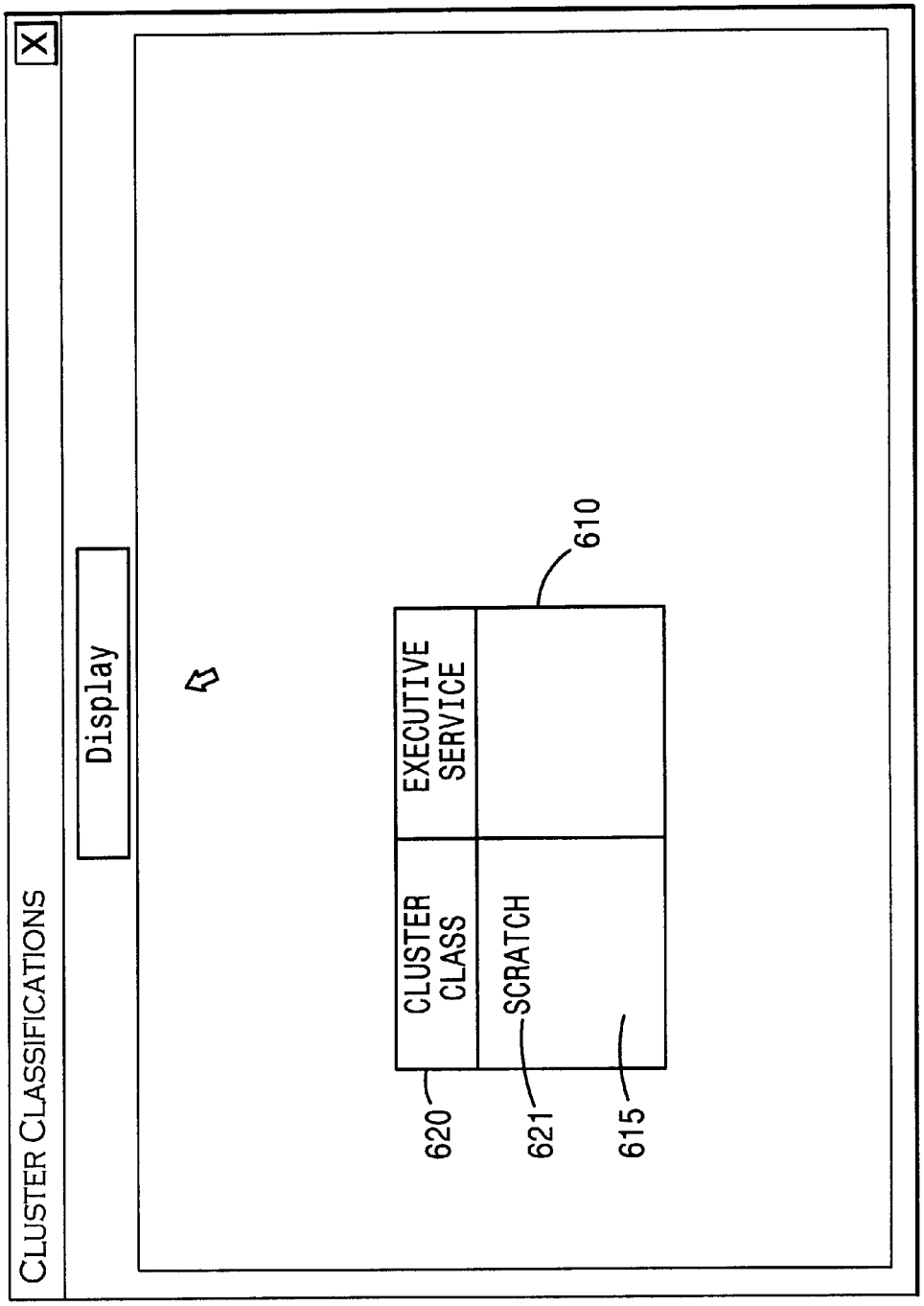
FIG. 6(a) shows a list of cluster classifications for analyzing defect data.
Figure 6B:
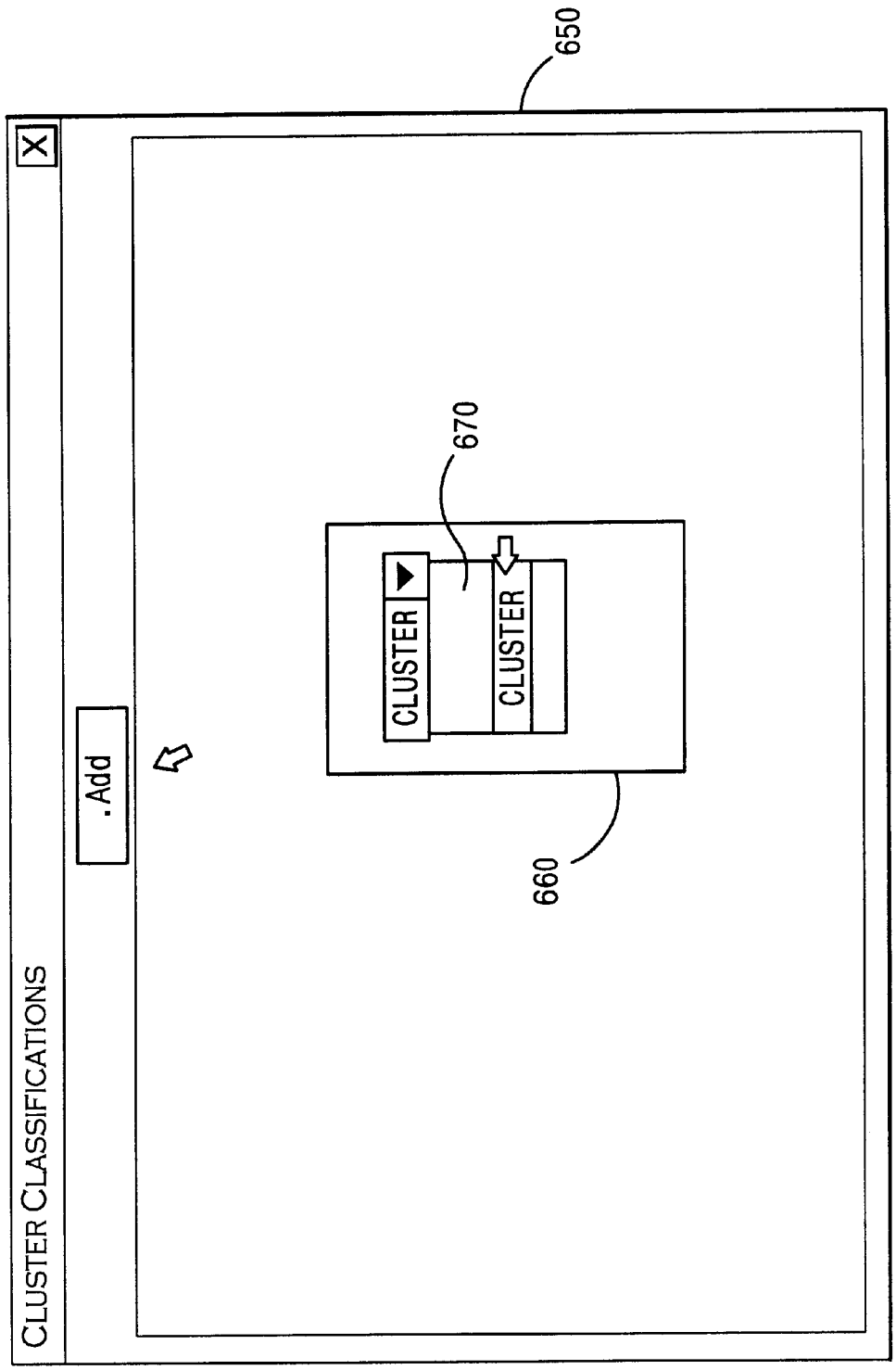
FIG. 6(b) shows a drop down list box for adding cluster classifications.
Figure 6C:
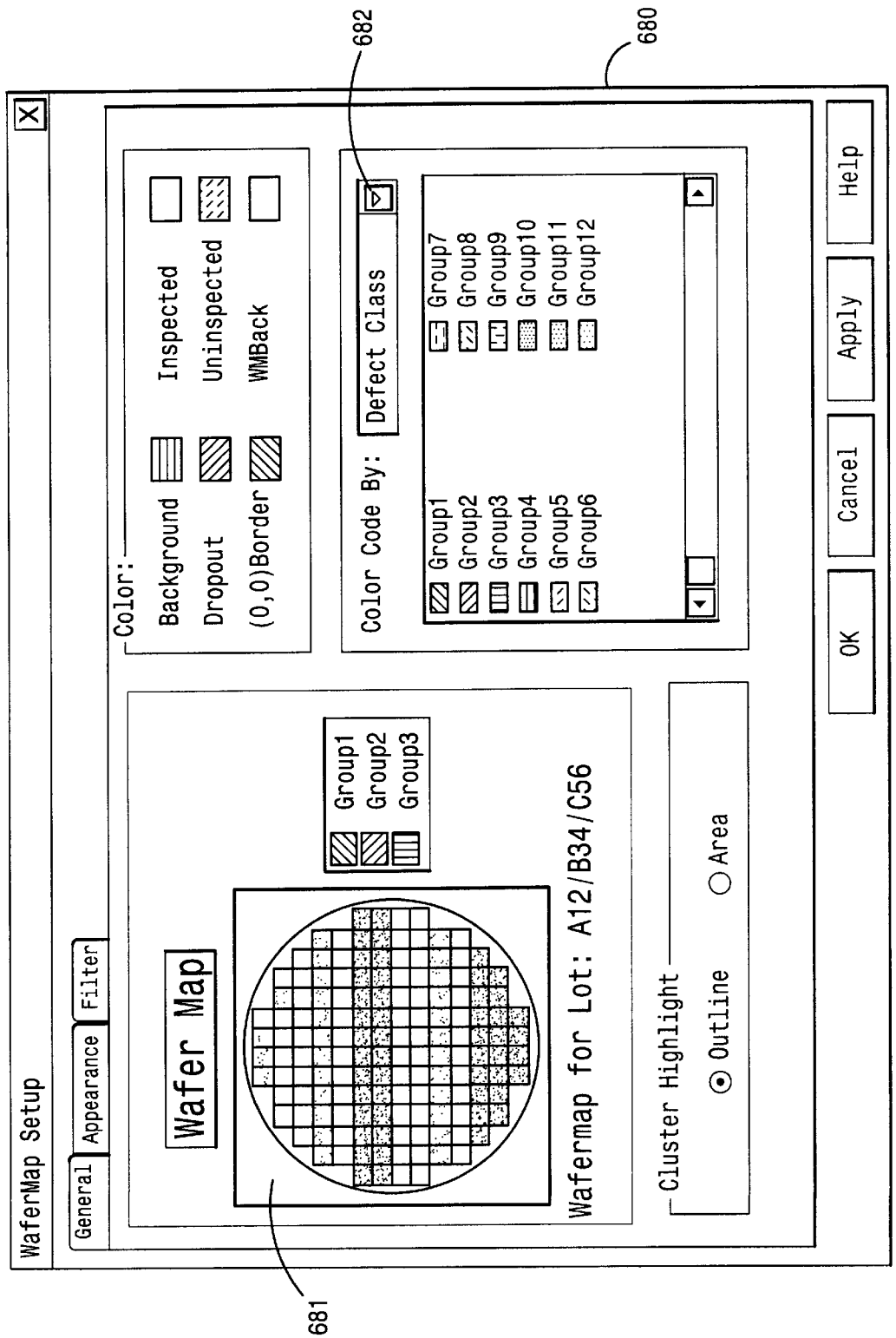
FIG. 6(c) shows a window for color coding the wafer map.
Figure 6D:
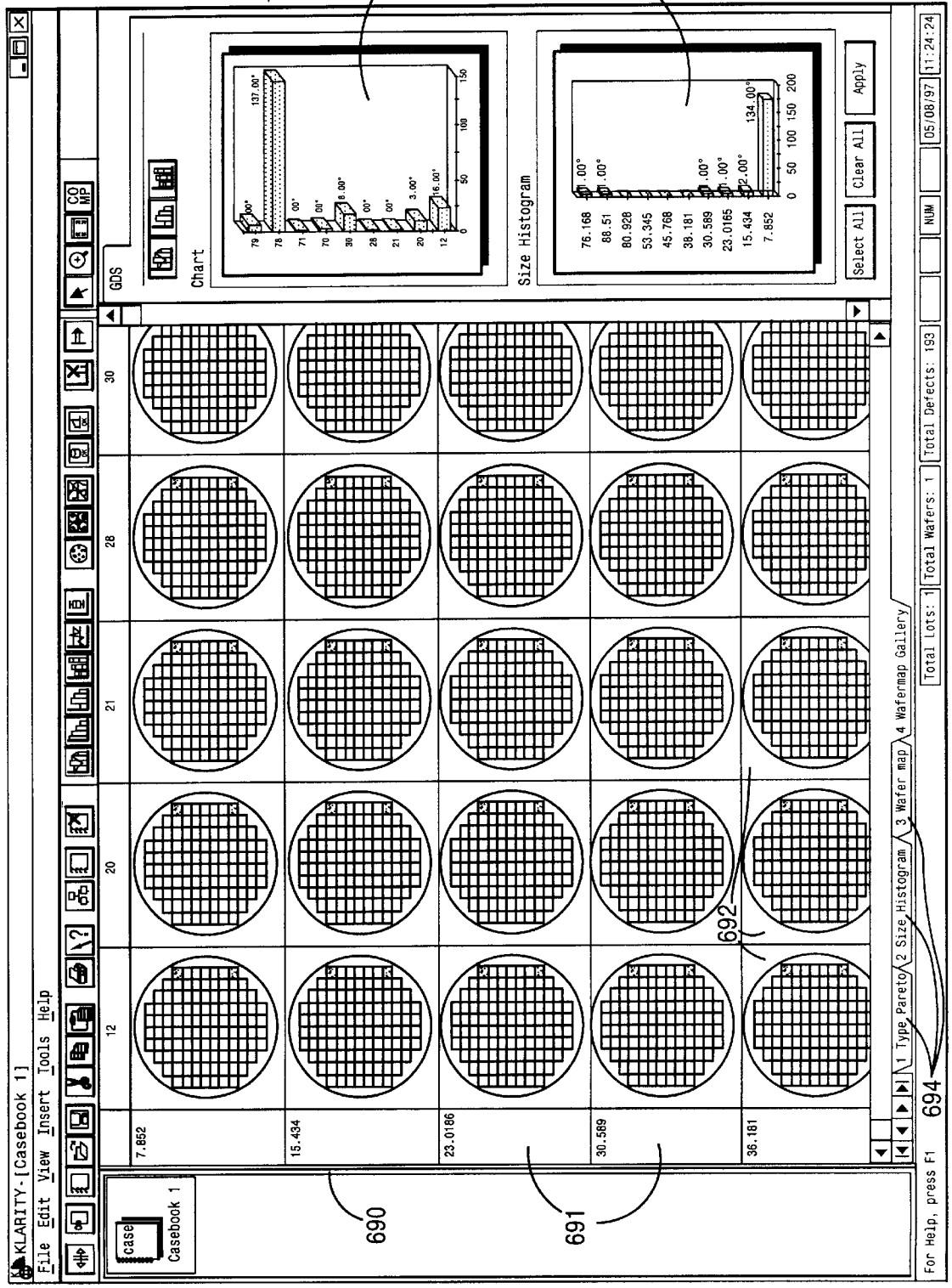
FIG. 6(d) shows a wafermap gallery.

FIG. 6(*b*) illustrates a window 650 for adding cluster classifications to the list of FIG. 6(a). The window 650 contains a drop down list box 660 with a plurality of prospective cluster classifications 670 for the X Axis. The customer clicks on the drop down list box with his computer mouse to select one of these cluster classifications 670, and this classification 670 is added to the left column 615 of the table namespace 610 of FIG. 6(*a*). The customer thereby has a greater degree of flexibility to insert new attributes 670 into the namespace 610 than would be possible with a static software package. Upon execution of the cluster classification 620 of FIG. 6(*a*), the customer filters the production map so that a production map of only the scratches remains. Analysis of the scratch data is then readily performed.

FIG. 6(*c*) shows a window 680 for color coding the wafer map 681. The customer selects from a drop down list box 682 to determine how the wafer is to be coded. FIGS. 6(*d*) and 6(*e*) show windows of wafermap and image galleries.

The wafermap gallery 690 of FIG. 6(*d*) contains a plurality of rows 691 and columns 692 of semiconductor wafers. Each row 691 may represent a particular type of wafer pattern while each column 692 may represent its lot number. A plurality of bar charts 693 are juxtaposed with the window of wafermap gallery 690 from FIGS. 2(*a*) and 3; a plurality of tabs 694 below wafermap gallery 690 permit the user to page between the various windows of FIGS. 2(*a*), 3 and 6(*e*).

Figure 6E:
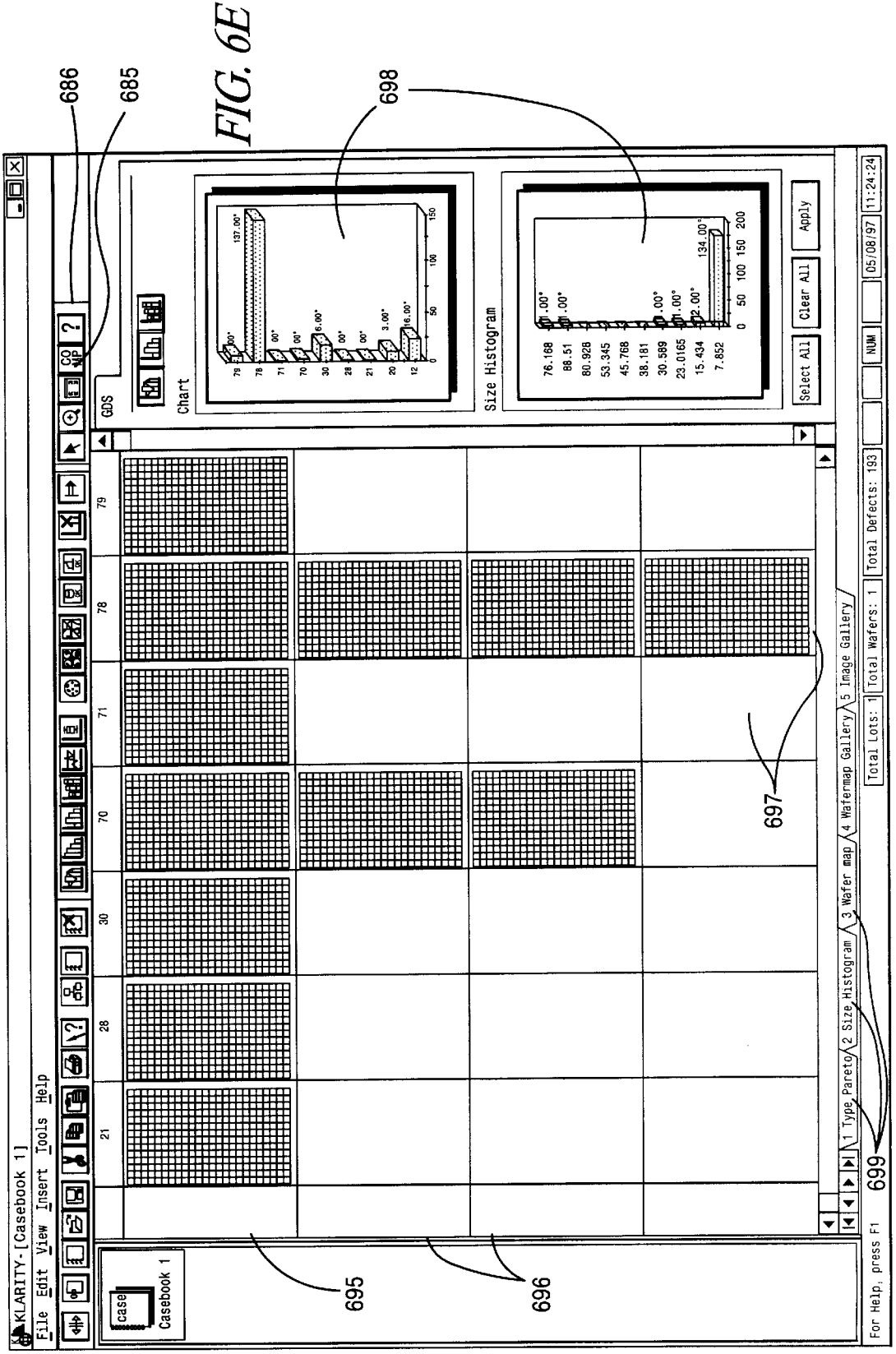
FIG. 6(e) shows an image gallery.

FIG. 6(e) shows an image gallery window 695 having a matrix of semiconductor wafer images arranged in rows 696 and columns 697, with the rows representing a particular type of wafer pattern and a column representing a lot number. A plurality of Type Pareto and Size Histogram bar charts 698 are juxtaposed with image gallery window 695, and a plurality of tabs 699 at the bottom of image gallery window 695 permit the user to page between windows. Toolbar 686 contains a magnification button 685 so that image gallery 695 of FIG. 6(e) is provided with a greater degree of magnification than the wafermap gallery 690 of FIG. 6(d).

5. System Architecture

Figure 7A:
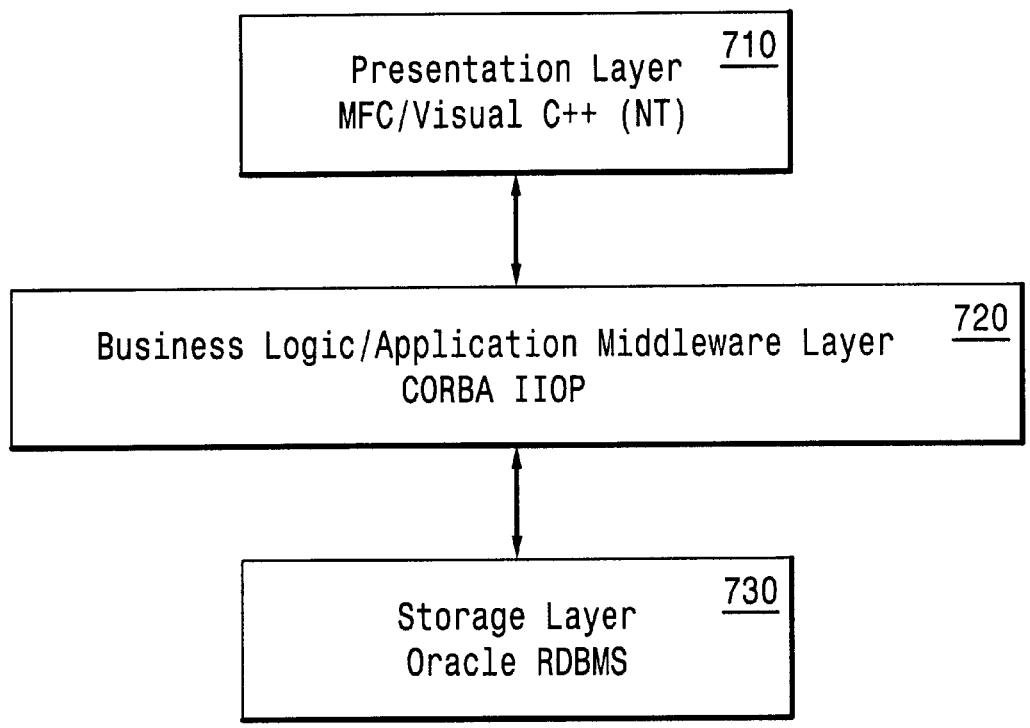
FIG. 7(a) illustrates the overall system architecture.

As shown in FIG. 7(a), the software system of the present invention utilizes a three-tier architecture. The highest tier 710 is the Presentation Layer, the object-oriented Windows® environment consisting of the menus, buttons, dialog boxes, and charts that are visible to the customer. The middle tier 720 is the CORBA (Common Object Request Brokered Architecture) IIOP (Inter-Internet Object Protocol) Middleware Layer, which distributes objects across servers and the Internet. The lowest tier 730, the Storage Layer, is a database containing raw production data which is connected by the CORBA Layer to other servers and the Presentation Layer.

Figure 7B:
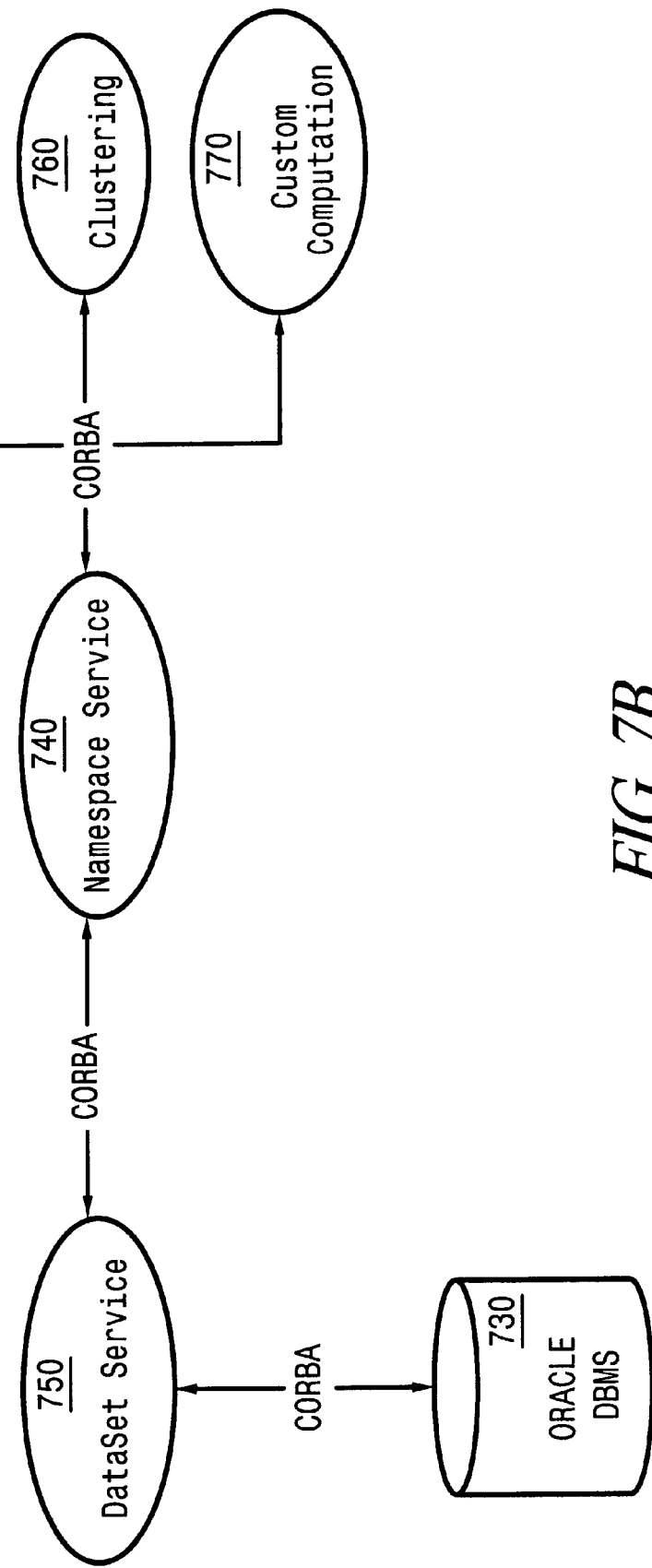
FIGS. 7(b) and 7(c) illustrate the interfaces of the middle layer architecture.

FIG. 7(b) shows how the CORBA Middleware Layer interfaces with the Storage Layer 730 and the Namespace Service 740 to modify the cluster classifications. CORBA is a mechanism of distributing objects across microcomputers and operating systems. The CORBA Middleware Layer provides access to the Server for objects that can reside anywhere on the network so that new cluster classifications can be presented from the Namespace Service 740 to the DataSet Service 750. One client in Ireland may, for example, discover a new method of clustering 760 or custom compilation 770 of the data in that location. This method may be relevant to the needs of a client in the United States. CORBA takes the Namespace Service 740 from the client in Ireland and applies it to the DataSet Service 750 from the United States over the server without having to access the production database in the United States to perform the analysis.

Figure 7C:
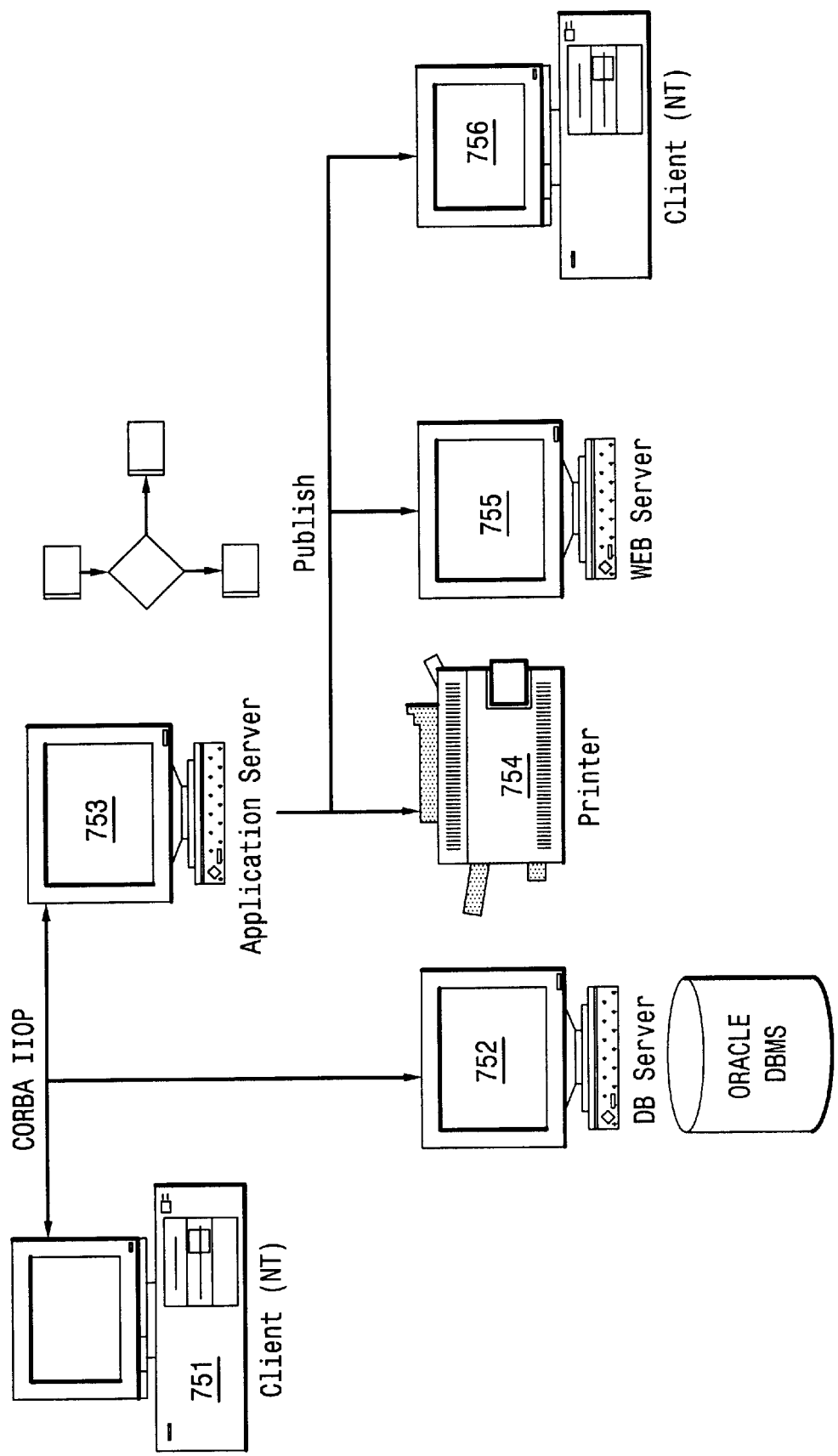

FIG. 7(c) shows how CORBA interfaces via the server from the client's personal computer 751 to other work stations and the Database Server 752. The Application Server 753 stores and distributes all of the various calculation modules or objects. The Application Server 753 can be the same as the Database Server 752, it can be the Client workstation 751, or anyplace else on the network. The recipes are contained in the Application Server 753, and once the recipes are run, the results can be published at a printer 754, WEB Server 755 or client personal computer 756.

Figure 8:
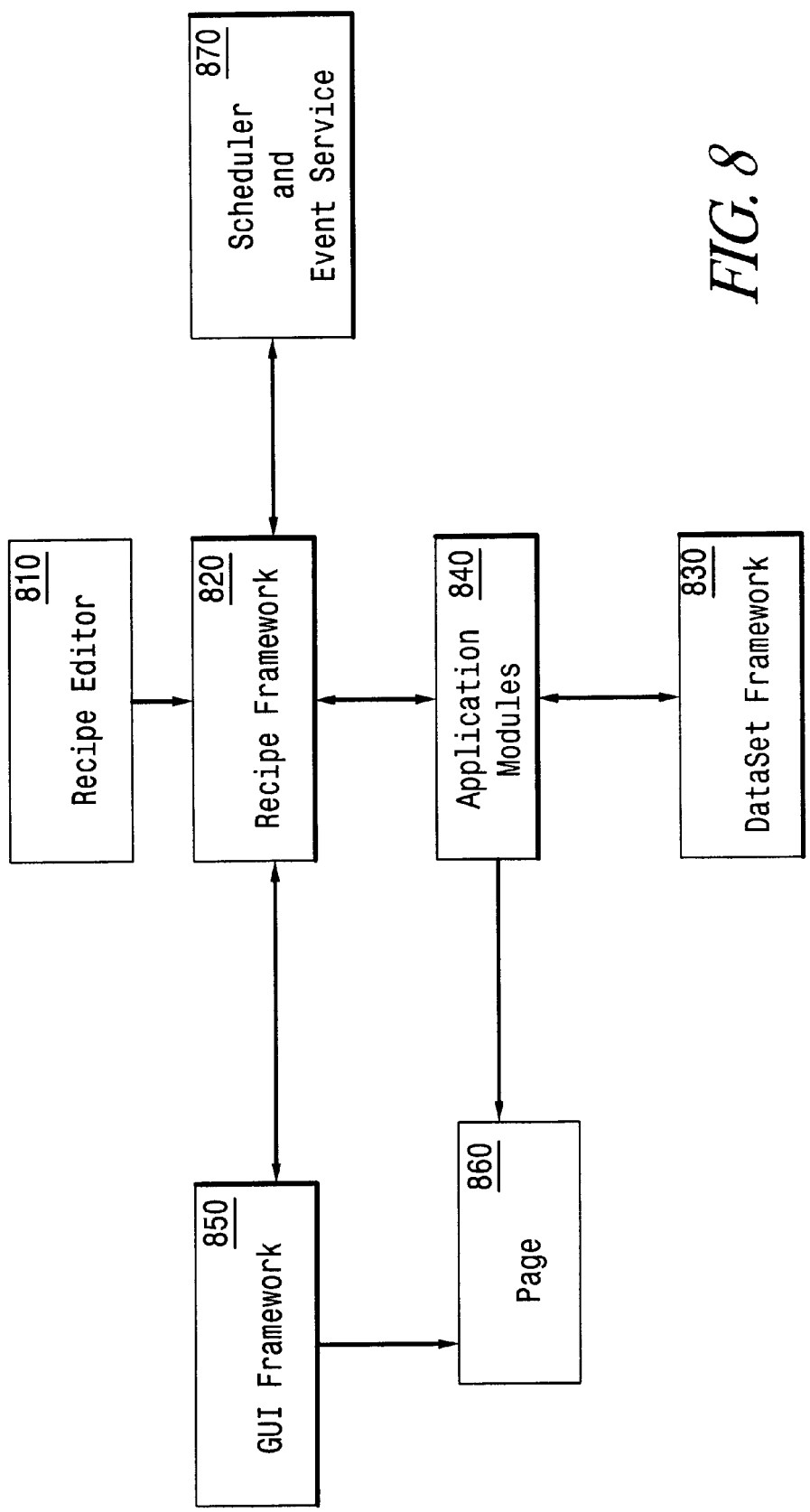
FIG. 8 illustrates the operation of the higher level software.

FIG. 8 shows a detail of the software architecture of the Presentation Layer, written in Visual C++ programming language. The Recipe Editor 810 permits the customer to create a Recipe Framework 820. The recipe is applied to the DataSet Framework 830 through the Application Modules 840, and with the GUI (Graphic User Interface) Framework 850, a Page 860 is produced in the Windows® format. The Recipe Framework 830 also interfaces with the Scheduler and Event Service 870, providing automatic execution and publication of production data analyses at future specified times.

The invention has been described above according to a preferred embodiment, but those having ordinary skill in the art should recognize that changes, substitutions and variations can be readily made without departing from the spirit of the invention. Accordingly, the invention is only construed to be limited by the claims set forth below.

We claim:

1. A software method for creating executable flowcharts on a computer, comprising the steps of:

selecting one or more production variables from dialog boxes in a user-defined sequence;

selecting one or more production functions from said dialog boxes in said user-defined sequence;

recording said user-defined sequence of said production variables and said production functions, said recording of said user-defined sequence is a macro recording of production variables and production functions;

displaying said user-defined sequence in a flowchart representing a series of linked analytical steps of said user-defined sequence;

automatically executing said series of linked analytical steps by selecting said flowchart;

changing said user-defined sequence to modify said flowchart;

redisplaying said user-defined sequence as a new flowchart; and reexecuting said new flowchart.

2. A software system for creating executable flowcharts on a computer, comprising:

dialog boxes for selecting one or more production variables and one or more production functions in a user-defined sequence;

a flowchart representing a series of linked analytical steps of said user-defined sequence displayed in a window;

wherein said flowchart of linked analytical steps is automatically executed by selecting said flowchart;

said user-defined sequence is modifiable into a new flowchart, said new flowchart being redisplayed and reexecuted.

* * * * *